United States Patent [19]

Goodall

[11] Patent Number: 4,657,766

[45] Date of Patent: Apr. 14, 1987

[54] YUCCA EXTRACT GRAIN TEMPERING MIXTURE AND PROCESS

[75] Inventor: S. Richard Goodall, Windsor, Colo.

[73] Assignee: Distributors Processing Inc., Porterville, Calif.

[21] Appl. No.: 723,177

[22] Filed: Apr. 15, 1985

[51] Int. Cl.$^4$ ............................................... A23B 9/00
[52] U.S. Cl. .................................... 426/309; 426/419; 426/507; 426/654; 426/655
[58] Field of Search ............... 536/6.3; 260/239.55 A; 426/303, 309, 418, 419, 654, 623, 635, 618, 506, 507, 655; 241/8, 12; 252/132, 174.17; 424/195.1

[56] References Cited

U.S. PATENT DOCUMENTS

| | | | |
|---|---|---|---|
| 2,054,026 | 9/1936 | Steindorff | 241/8 |
| 2,301,787 | 8/1941 | Nord | 536/6.3 |
| 2,715,122 | 8/1955 | Rothman | 536/6.3 |
| 2,895,953 | 7/1959 | Wall | 536/6.3 |
| 3,583,914 | 6/1971 | Garvin | 422/304 |
| 3,598,746 | 8/1971 | Kaniecki et al. | 252/132 |
| 3,682,653 | 8/1972 | Mommer | 426/309 |
| 4,223,045 | 9/1980 | Fink | 426/623 |
| 4,542,031 | 9/1985 | Nakajima et al. | 426/623 |

FOREIGN PATENT DOCUMENTS

| | | | |
|---|---|---|---|
| 2040945 | 9/1980 | United Kingdom | 426/655 |
| 1102821 | 7/1984 | U.S.S.R. | 252/132 |

OTHER PUBLICATIONS

Sullivan, Cereal Chem., vol. 18, pp. 695–696, 1941.

Primary Examiner—Robert Yoncoskie
Assistant Examiner—Carolyn Paden

[57] ABSTRACT

A mixture and process for tempering feed grain by adding a natural surfactant in the form of a extract of the yucca plant to the grain. The yucca extract contains generally 10 to 11 percent sarsasaponin by weight which is diluted with water and sprayed on grain just prior to processing in rollers for flaking to increase water intake and gelatinization. The mixture also contains small amounts of copper sulfate and sodium benzoate as preservatives. Combinations of the mixture can also be used such as combinations with other known grain tempering compositions. The grain tempering yucca extract mixture is either sprayed on the grain as it is dumped into a steam cabinet or is sprayed on the grain which is then allowed to sit in a conditioning tank for a predetermined period of time.

6 Claims, No Drawings

YUCCA EXTRACT GRAIN TEMPERING MIXTURE AND PROCESS

FIELD OF THE INVENTION

This invention relates to compositions for tempering or conditioning feed grain and more particularly relates to the use of sarsasaponin containing extract from Yucca plants to temper grain.

BACKGROUND OF THE INVENTION

Grains such as milo, corn, and others for feeding cattle are typically processed to aid in their digestion as well as to increase the intake of nutrients. Such processing takes the form of rolling or flaking the corn or milo after softening it in a steam chamber. Products are available which assist in conditioning or softening the grain to reduce the costs of the processing. These products generally increase the moisture intake allowing thinner higher volume flakes to be produced by the rolling process.

Another aspect of this process is that processing costs can be reduced. Processing with these conditioners is less detrimental to machinery and requires less power thus reducing costs.

The resultant grain tempering processes presently available produce a much improved feed grain which results in improved grain feed efficiency. Greater moisture absorption and thinner rolling of the grain into flakes causes increased gelatinization resulting in improved animal consumption and assimilation.

In grain processing or rolling to produce flakes production capacity may also be limited because of the lack of moisture in the grain which means that the rolling process requires greater pressure and increased power. The resistance caused by the grain having a minimum amount of the moisture also can reduce production volume in addition to the wear and tear on the processing machinery.

A disadvantage of some of the present grain conditioning or tempering materials is that they are chemical compounds which can be caustic or corrosive to machinery. Further, some tempering or grain conditioning chemical compositions might be toxic to the cattle. It would be advantageous if a grain tempering product were available that was non-caustic, non-corrosive corrosive and naturally occuring surfactant which could be used to condition or temper grain.

It is therefore one object of the present invention to provide a grain tempering mixture that is non-caustic, non-corrosive which will not corrode feed milling equipment or be a hazard to people who have to handle it.

Another object of the present invention is to provide a grain tempering mixture which contains a natural surfactant which is already food approved.

Still another object of the present invention is to provide a natural occurring grain tempering mixture which can aid in the water or moisture uptake by grain allowing more water to be added at a fast rate over a shorter period of time.

Still another object of the present invention is to provide a natural occurring tempering product which sufficiently tempers grain to reduce friction and wear on grain processing equipment as it is a natural lubricant.

Still another object of the present invention is to provide a natural occurring grain tempering product which reduces fines in the feed mill and feed bunk.

Yet another object of the present invention is to provide a naturally occurring grain tempering product which increases gelatinization of starch in grain, rendering it more digestible.

Still another object of the present invention is to provide a grain tempering process which increases the bulk of grain providing more tons of grain per processed dry grain.

BRIEF DESCRIPTION OF THE INVENTION

The purpose of the present invention is to provide a naturally occurring surfactant for use in grain tempering which will improve grain processing both in the amount of grain produced and volume of grain and will also reduce production costs. The product of the present invention is formulated by a simple extraction process that is known in the art for extracting sarsasaponin containing extracts from a variety of Yucca plants particularly Yucca Schidigera and others which are the subject of many patents such as U.S. Pat. Nos. 2,791,581, 2,715,122, and 2,895,953. This Yucca extract contains generally in the range of 10 to 11 percent total dissolved solids by weight. Approximately one-half of the total dissolved solids are made up of steroidal saponins hereinafter collectively referred to as sarsasaponin. Sarsasaponin or sarsasapogenin saponin as they are referred to in the literature would represent only one of a group of steroidal saponins found Yucca extracts and smilogenin, hecogenin saponin, rockogenin saponin and tigogenin saponin may also be present in lesser amounts. To this extract is added approximately 200 parts per million of either copper sulfate or sodium benzoate as a perservative which is approximately one ounce per 40 to 50 gallons. This sarsasaponin product or extract can be diluted with water and sprayed on grain just prior to processing to increase water intake and gelatinization and improve overall costs of grain processing.

The product or extract containing sarsasaponin can be used alone but is generally used in combination with other known formulated chemical compositions. One preferred mixture combines 10 to 11 percent sarsasaponin with a 25 percent propylene glycol (by weight) composition to prevent freezing during winter. The resultant mixture contains approximately 7.5% to 8.25% plant saponins, 2.75% propylene glycol, 200 parts per million copper sulfate or sodium benzoate and the remainder water.

Before being used for grain tempering this mixture is further diluted approximately 20 to 100 parts with water to give a satisfactory distribution in grain feed application. Applications of the grain tempering composition are accomplished through a metering pump, a reservoir tank containing the diluted product, a hose and a spray nozzle.

The above and other features and objects of the invention will be more fully understood from the following detailed description.

DETAILED DESCRIPTION OF THE INVENTION

The grain tempering product of the present invention is comprised of an extract containing Sarsasaponin and particularly a Yucca shidegra extract which is diluted and applied to grain just prior to processing or is combined with other mixtures. The diluted yucca sarsasaponin is metered and sprayed on grain just prior to the grain being steamed. That is, as the grain is gravity fed down a chute to a steam chamber, the grain tempering mixture is sprayed on the grain at a rate of approximately 5 gallons of diluted, mixed extract containing sarsasaponin per ton of milo grain or other grain. After being sprayed the temperature in the steam chamber or cabinet is raised to approximately 208° to 210° F. and held there (usually by steam flow regulation) for a period of about 10 to 20 minutes. The grain is then allowed to drop from the steam cabinet or chamber through rolls whereby both the heat, moisture, and pressure result in a flaked, gelatinized, desirable end product.

As an alternative, the extract containing sarsasaponin can be combined with other products before application to the grain. One such product is propylene glycol commonly added to reduce or prevent freezing during winter. This is mixed with the Yucca extract in proportions such that there is about 2.75% propylene glycol. This mixture is shipped as is for later dilution with water for spraying on the grain as it comes down a chute to a steam chamber. For application through spray nozzles the product is typically diluted in water (1:20 to 1:100) to give a satisfactory distribution during feed grain processing. One type of industry feed mill is set up with overhead grain bins and drop chutes that allow gravity flow feed of the grain to processing equipment. The gravity flow from the overhead bin allows the grain to flow down the chute usually at a 45 degree angle. A spray nozzle positioned adjacent to a delivery chute can spray the diluted mixture from a reservoir tank through a hose by means of a pump which meters the flow to approximately 150-200 ml sarsasaponin per ton. Thus the tempering mixture is sprayed onto the grain just before it drops into the steam cabinet.

One example of such processing equipment is a Ross Roller mill with a one ton capacity grain steam chest or cabinet. The Ross mill has rollers that are about 18×24, with ten grooves per inch and are set for milo at approximately a 0.003" clearance and for corn at a 0.2" clearance. Corn is much larger than milo and therefore is slightly more difficult to roll. A half inch inner diameter hose can be used to deliver mixture to a fan spray nozzle attached to the side of a delivery chute such as a drop chute just below the door of the overhead grain bin. Roller rotational rates would be set to process in the range of approximately 200 pounds of rolled grain per minute for milo or one ton every ten minutes. The power to drive the roller is measured by amperage (i.e. amps) which fluctuates and is influenced by grain hardness or kernel size. Application of the grain tempering mixture of the present invention can reduce the power or amps and influence (i.e. improve) the costs of flaking or processing.

A variation of the process disclosed herein is that of dry rolling corn. This variation involves the same initial steps as steam processing milo except no steam is applied. The grain is sprayed as it is dropped into the steam cabinet and the grain allowed to condition or temper inside the steam cabinet for a minimum of five minutes before it is rolled. Some feed mills are equipped with a tempering "tank" in which the grain may be conditioned instead of allowing the grain to "condition" in a steam cabinet. As mentioned previously, the rolls are set wider apart to accomodate the larger size of the corn kernel as compared to milo. In the processing the conditioned grain it is allowed to drop from the cabinet through the rolls where the moisture and pressure result in a rolled, conditioned end product.

A variation of the process is the combination of the extract containing sarsasaponin with other manufacturers chemical formulations. Formulations or products which the sarsasaponin may be combined with are products known by the trademarks of E-Z Flake, Temper, and Super Kem-Flake. The E-Z Flake and Super Kem-Flake were combined with sarsasaponin to provide 200 ml/ton of grain of E-Z Flake for each 150 ml of the sarsasaponin extract. Temper was combined with extract containing sarsasaponin to provide 100 ml/ton of Temper per each 150 ml of sarsasaponin. The Super Kem-Flake combination seemed to respond best in combination with sarsasaponin extract. Grain volume increased as bushel weights dropped an additional 8% while moisture uptake increased by approximately 4% or more. The extract containing sarsasaponin tempering alone did just as well as the combinations to produce starch gelatinization. The chemical composition of these products are:

(1) E-Z Flake: lecithin, proprionic acid and water.

(2) Temper: ammonium lignin sulfonate, phosphoric acid, poloxylene, 1-2 propanediol, proprionic acid and anise.

(3) Super Kem-Flake: Deionized water, proprionic acid, ammonium chloride, trisodium phosphate, monoglyceride, diglyceride, acetic acid, proplyene glycol and artificial color.

In addition to the mixtures described above other possible variations of the tempering process are the substitution of other Yucca extracts for Yucca Schidigera extract by removing the soluble solids and substituting them for the particular Yucca extract or sarsasaponin previously used. Many Yucca species contain steroidal saponins in similar quantities as compared to Yucca Schidigera as determined by total dissolved solids. However, the relative proportion of individual steroidal saponins may vary. For example, sarsasapogenin and smilogenin saponin, which predominate in Yucca Schidigera, may be present in lesser amounts as compared to tigogenin saponin, among others, found in other Yucca species. These extracts may also be effective in grain conditioning as steroidal saponins from Yucca Schidigera extract produced for that purpose. Based upon surfactant activity the steroidal saponins from other Yucca species may produce similar results; and may be as effective as the Yucca Schidigera extract produced for the purpose of conditioning grain disclosed herein.

Grain processing using the grain tempering products containing the sarsasaponin extract resulted in the following improvements.

(1) Moisture uptake of the grain was increased in the range of 8 to 12 percent.

(2) Less steam time was required to maintain the same quality flakes of grain. That is, approximately 10 to 15 minutes versus the normal 20 minutes without the use of the grain tempering product.

(3) Greater grain volume was produced by lower bushel weights of grain by adding 150 to 200 mililiters of sarsasaponin extract per ton.

(4) Higher percentage gelatinized starch was obtained.

Thus there has been disclosed a novel, natural occurring grain tempering product and process which greatly improves volume, moisture uptake, and processing of cattle feed grain. The product described can be used alone in a diluted fashion or combined with other products for grain tempering.

The invention is not to be limited by the embodiments described in the description which are given by way of example and not limitation but only in accordance with the scope of the appended claims.

What is claimed is:

1. A grain conditioning mixture for treating feed grain being processed into flakes to increase water intake of the grain improving gelatinization and digestibility comprised of;
   a Yucca extract containing sarsasaponin mixed with approximately 2.75% propylene glycol, and 20 to 100 parts water per part of said Yucca extract whereby said mixture improves. grain wetability, moisture intake and gelatinization when sprayed onto said feed, thereby increasing the volume of processed grain.

2. The mixture according to claim 1 in which said Yucca extract contains approximately 10% sarsasaponin.

3. The mixture according to claim 2 in which said Yucca extract containing sarsasaponin is an extract from the Yucca Schidigera plant.

4. A process for conditioning grain to improve water intake and gelatinization when undergoing a flaking process comprising;
   mixing a Yucca extract containing sarsasaponin with approximately 2.75% propylene glycol; diluting said mixture of Yucca plant extract containing sarsaponin and propylene glycol with approximately 20 to 100 parts water
   spraying said grain with said diluted mixture of Yucca extract containing sarsasaponin and propylene glycol evenly on said grain prior to delivery to flake processing machinery;
   Whereby moisture intake and gelatinization are improved and the volume of processed grain resulting from the flake process is increased.

5. The process according to claim 4 in which said Yucca plant extract contains approximately 10% sarsasaponin.

6. The process according to claim 5 in which said Yucca plant extract is a Yucca Schidigera extract.

* * * * *